US012077932B2

(12) United States Patent
Knapper et al.

(10) Patent No.: US 12,077,932 B2
(45) Date of Patent: Sep. 3, 2024

(54) QUICK COUPLER HAVING LATERAL ACTUATING LEVERS

(71) Applicant: Robert Bosch GmbH, Stuttgart (DE)

(72) Inventors: Steffen Knapper, Vaihingen/Enz (DE); Frank Rieckhof, Ludwigsburg (DE); Tanja Ernstmeier, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 704 days.

(21) Appl. No.: 17/307,631

(22) Filed: May 4, 2021

(65) Prior Publication Data

US 2021/0348360 A1   Nov. 11, 2021

(30) Foreign Application Priority Data

May 6, 2020 (DE) .................. 10 2020 205 694.3

(51) Int. Cl.
*E02F 3/36* (2006.01)
(52) U.S. Cl.
CPC .......... *E02F 3/3663* (2013.01); *E02F 3/3622* (2013.01); *Y10T 137/87925* (2015.04)
(58) Field of Classification Search
CPC ....... Y10T 137/7854; Y10T 137/87925; Y10T 137/879736; Y10T 137/87973; E02F 3/3663; E02F 3/3622
See application file for complete search history.

(56) References Cited

U.S. PATENT DOCUMENTS

| | | | | |
|---|---|---|---|---|
| 2,484,924 A * | 10/1949 | Anderson | ............... | F16L 37/42 251/149.6 |
| 3,301,272 A * | 1/1967 | Pettyjohn | ................ | F16L 37/36 137/614.06 |
| 3,680,591 A * | 8/1972 | Vik | .......... | F16L 37/30 137/614.05 |
| 3,710,823 A * | 1/1973 | Vik | ................... | F16K 31/52425 285/124.1 |
| 3,730,221 A * | 5/1973 | Vik | ......... | F16L 37/33 137/614.04 |
| 3,881,514 A * | 5/1975 | Berg | ........ | F16L 37/30 137/614.04 |
| 4,074,698 A * | 2/1978 | Hobson | ................... | F16L 37/36 137/614.04 |
| 4,102,356 A * | 7/1978 | Knight | .................... | F16L 37/26 251/149.9 |

(Continued)

FOREIGN PATENT DOCUMENTS

DE   10 2015 202 916 A1   8/2016
EP      0 381 069 B1       8/1990

*Primary Examiner* — Daphne M Barry
*Assistant Examiner* — Frederick D Soski
(74) *Attorney, Agent, or Firm* — Maginot, Moore & Beck LLP (57) ABSTRACT

A quick coupler includes a housing in which a first and a second coupler cartridge are received. The spaced-apart center axes of the first and second coupler cartridges each run parallel to a vertical axis such that the center axes are contained in a common reference plane. The quick coupler further includes a first actuating lever and a second actuating lever for actuating the coupler cartridges. First and a second axes of rotation of the respective first and second actuating levers are oriented perpendicularly to the reference plane, and a first actuating arm and a second actuating arm are arranged to perpendicularly to the reference plane on opposite sides of the housing.

11 Claims, 6 Drawing Sheets

(56) References Cited

U.S. PATENT DOCUMENTS

| | | | | |
|---|---|---|---|---|
| 4,126,294 A * | 11/1978 | DeFrees | F16K 27/07 | 251/149.6 |
| 4,210,348 A * | 7/1980 | Hobson | F16L 37/23 | 285/1 |
| 4,303,098 A * | 12/1981 | Shindelar | F16L 37/35 | 137/596.2 |
| 4,373,551 A * | 2/1983 | Shindelar | F16L 37/32 | 137/614.04 |
| 4,549,577 A * | 10/1985 | Kugler | F16L 37/23 | 137/614.04 |
| 4,582,295 A * | 4/1986 | Kugler | F16L 37/32 | 137/614.04 |
| 4,881,573 A * | 11/1989 | Durant | F16L 37/56 | 137/614.04 |
| 5,074,332 A * | 12/1991 | Jones | F16L 37/35 | 251/149.9 |
| 5,095,947 A * | 3/1992 | Weh | F16L 37/36 | 285/321 |
| 5,316,033 A * | 5/1994 | Schumacher | F16L 37/36 | 137/614 |
| 5,342,098 A * | 8/1994 | Wilkins | F16L 37/56 | 285/309 |
| 5,464,042 A * | 11/1995 | Haunhorst | F24F 13/0209 | 137/614.04 |
| 5,896,889 A * | 4/1999 | Menard | F16L 37/23 | 137/614.04 |
| 5,934,319 A * | 8/1999 | Schumacher | F16L 37/36 | 137/614.05 |
| 5,983,920 A * | 11/1999 | Gapinski | B60S 5/04 | 251/149.6 |
| 5,988,697 A * | 11/1999 | Arosio | F16L 37/56 | 285/124.1 |
| 6,035,894 A * | 3/2000 | Weh | F16L 37/1215 | 137/614.05 |
| 6,182,695 B1 * | 2/2001 | Coates, III | B67D 7/3218 | 137/315.27 |
| 6,453,945 B1 * | 9/2002 | Schumacher | F16L 37/56 | 137/614.04 |
| 6,945,273 B2 * | 9/2005 | Reid | F16L 37/244 | 251/149.9 |
| 7,568,502 B2 * | 8/2009 | Marquis | F16L 37/56 | 137/614.04 |
| 8,007,010 B2 * | 8/2011 | Langenfeld | F16L 37/56 | 285/38 |
| 8,517,428 B2 * | 8/2013 | Langenfeld | E02F 9/2275 | 285/38 |
| 9,732,893 B2 * | 8/2017 | Konishi | F16L 37/096 | |
| 9,857,010 B2 * | 1/2018 | Konishi | F16L 37/12 | |
| 9,897,239 B2 * | 2/2018 | Konishi | F16L 37/36 | |
| 10,156,310 B2 * | 12/2018 | Foner | F16L 37/32 | |
| 10,197,201 B2 * | 2/2019 | Ferrara | F16L 37/42 | |
| 10,400,913 B2 * | 9/2019 | Konishi | F16K 31/602 | |
| 10,704,719 B2 * | 7/2020 | Canzi | F16L 29/007 | |
| 11,009,165 B2 * | 5/2021 | Tiberghien | F16L 37/33 | |
| 11,078,642 B2 * | 8/2021 | Restaino, III | F16L 37/107 | |
| 11,098,830 B2 * | 8/2021 | Danelli | F16L 37/28 | |
| 11,435,018 B2 * | 9/2022 | Foner | E02F 9/2275 | |
| 11,499,661 B2 * | 11/2022 | Neri | F16K 31/52 | |
| 2011/0079306 A1 * | 4/2011 | Tiberghien | F16L 37/36 | 137/798 |
| 2011/0079742 A1 * | 4/2011 | Tiberghien | F16L 37/36 | 137/614.04 |
| 2012/0181465 A1 * | 7/2012 | Rusconi | F16L 37/36 | 137/614.04 |
| 2015/0240977 A1 * | 8/2015 | Zonneveld | F16L 23/032 | 251/149.6 |
| 2016/0281895 A1 * | 9/2016 | Allevi | F16L 37/32 | |
| 2016/0290542 A1 * | 10/2016 | Gatti | F16K 11/185 | |
| 2019/0145561 A1 * | 5/2019 | Canzi | F16K 31/52408 | 251/149 |
| 2020/0018036 A1 * | 1/2020 | Restaino, III | E02F 3/3654 | |

* cited by examiner

QUICK COUPLER HAVING LATERAL ACTUATING LEVERS

This application claims priority under 35 U.S.C. § 119 to application no. DE 10 2020 205 694.3, filed on May 6, 2020 in Germany, the disclosure of which is incorporated herein by reference in its entirety.

The disclosure relates to a quick coupler having a housing in which a first and a second coupler cartridge are received, wherein the spaced-apart center axes thereof each run parallel to a vertical axis such that they are contained in a common reference plane, wherein the reference plane contains a transverse axis which is arranged perpendicularly to the vertical axis, wherein a longitudinal axis is arranged perpendicularly to the reference plane, wherein the first coupler cartridge is assigned an actuating lever, which is pivotable with respect to a first axis of rotation, having a first actuating cam and a first actuating arm, wherein the first actuating cam can be brought into actuating engagement with an end side of the first coupler cartridge that points in the direction of the vertical axis, wherein the second coupler cartridge is assigned a second actuating lever, which is pivotable with respect to a second axis of rotation, having a second actuating cam and a second actuating arm, wherein the second actuating cam can be brought into actuating engagement with an end side of the second coupler cartridge that points in the direction of the vertical axis, wherein the first and the second actuating arm are arranged outside of the housing.

BACKGROUND

DE 10 2015 202 916 A1 discloses a valve disk having integrated coupler cartridges. Here, the coupler cartridges are actuated by a common actuating lever which in turn acts on auxiliary levers which are each assigned to one of the two coupler cartridges. The present disclosure is applicable both to such integrated coupler cartridges and to coupler cartridges which are received in a separate housing which is built onto a valve disk.

EP 381 069 B1 discloses coupler cartridges which, for actuation, are provided with an actuating lever. Comparable coupler cartridges are available on the market in different nominal sizes.

SUMMARY

One advantage of the present disclosure is that the lever actuation of the coupler cartridges is designed to be simple and cost-effective. It functions very reliably. Furthermore, the actuating levers require little installation space next to the housing of the quick coupler. The coupler cartridges can be configured with different nominal sizes without there being a change in the connection dimensions of the quick coupler and in the position of the actuating portions. The grid spacing with which the quick couplers can be lined up against one another can be chosen to be small. Particularly when installing the quick coupler in an agricultural tractor at the rear end of the vehicle, the actuating portions of the actuating levers are readily accessible to the user. There is no fear of them being operated unintentionally during the operation of the tractor.

According to the disclosure, it is proposed that the first and the second axis of rotation be oriented perpendicularly to the reference plane, wherein the first and the second actuating arm are arranged, in the direction of the longitudinal axis, on opposite sides of the housing. The first and/or the second actuating lever are preferably formed in one piece. The housing is preferably fastened to a separate underhousing which is a constituent part of a valve disk. However, it is also conceivable for the housing itself to be a constituent part of the valve disk or of a monolithic valve block. In a central neutral position, the first and the second actuating arm are preferably arranged substantially parallel to the transverse axis. The quick coupler is preferably designed in such a way that a plurality of quick couplers can be lined up against one another along the longitudinal axis with a fixed grid spacing. Here, the grid spacing is preferably between 105% and 150% of the largest outside diameter of the first or second coupler cartridge.

There can be provision that the first and/or the second actuating arm, as viewed in cross section, have/has a substantially rectangular cross-sectional shape with a relatively long and a relatively short rectangle side, wherein the relatively long rectangle side is at least double as long as the relatively short rectangle side, wherein the relatively long rectangle side is oriented parallel to the reference plane. The relatively short rectangle side is thus the size that is determining for the discussed grid spacing. Consequently, the grid spacing can be chosen to be small. The aforementioned rectangle shape preferably coincides in certain portions with an ideal reference rectangle, with it otherwise being arranged completely within the reference rectangle. The aforementioned rectangle shape preferably has rounded corners. The first and/or the second actuating arm preferably extend/extends substantially parallel to the reference plane with its surface defined by the relatively long rectangle side. The aforementioned lengths of the rectangle sides preferably relate to the reference rectangle.

There can be provision that the relatively long rectangle side of the first or second actuating arm, in the context of the pivoting movement of the relevant actuating arm, in each case defines a first or a second boundary plane, wherein the quick coupler is arranged substantially completely between the first and the second boundary plane. This makes it possible for the quick couplers to be able to be lined up in the desired manner along the longitudinal axis. The corresponding grid spacing is preferably minimally larger than the distance separating the first and second boundary plane. The quick coupler is preferably fastened to an assigned valve disk, in particular by screwing. A plurality of valve disks are preferably fixedly connected to one another such that they produce a valve block. The corresponding sealing surfaces preferably coincide with the aforementioned first or second boundary plane or are arranged parallel thereto by a small distance. Where mention is made above to "substantially completely", the corresponding exceptions are explained further below. What these exceptions share in common is that a projection on one boundary plane corresponds to a recess on the other boundary plane.

There can be provision that the first and second actuating arm have a respective first or second free end, wherein the first and the second free end are arranged, in the direction of the transverse axis, on the side of the housing which is assigned to the first coupler cartridge, wherein the first actuating arm is designed to be shorter than the second actuating arm. This means that, in the transverse direction, accessibility to the actuating levers must be ensured only on one side of the housing. This advantage is particularly relevant when the valve block in question is a constituent part of an agricultural tractor and is installed under confined space conditions. In the direction of the longitudinal axis, the first and the second free end are preferably arranged in alignment when the first and second actuating lever are situated in the same position, in particular the neutral position.

There can be provision that the first and the second free end each have a plate-like fastening portion which is arranged, in the direction of the longitudinal axis, completely on that side of the relevant first and second actuating arm which faces the other, second or first, actuating arm. This allows a large actuating portion to be realized without the grid spacing having to be increased. The two actuating portions are arranged in particular completely between the first and the second boundary plane. In at least one position of the first and second actuating lever, they are preferably directly opposite one another at a small distance apart. The two actuating portions are preferably each arranged completely next to the reference plane. The plate-like actuating portions are preferably configured as a planar plate with a constant thickness. They are preferably oriented perpendicularly to the reference plane.

There can be provision that a first free end of the first actuating arm and the first axis of rotation are arranged, in the direction of the transverse axis, on opposite sides of the first coupler cartridge and/or that a second free end of the second actuating arm and the second axis of rotation are arranged, in the direction of the transverse axis, on opposite sides of the second coupler cartridge. This means that in particular the shorter first actuating arm can be designed to be comparatively long such that the assigned actuating portion experiences a large actuating travel which in turn results in small actuating forces. Both the first and the second actuating arm are preferably configured in the aforementioned manner such that they can be operated identically. It then makes no difference to the user whether the latter actuates the first or the second coupler cartridge.

There can be provision that the first and the second actuating arm are configured with different lengths, wherein the effective lengths of the first and the second actuating cam are designed to be different in such a way that in each case a substantially identical lever ratio results on the first and second actuating lever. It then makes no difference to the user whether the latter actuates the first or the second coupler cartridge. What is to be understood by the effective length of the first or second actuating cam is in particular the distance between the relevant axis of rotation and the center axis of the relevant coupler cartridge.

There can be provision that the first and second actuating arm extend with a bent profile in such a way that, in each pivoted position, as viewed in the direction of the longitudinal axis, they are arranged substantially completely next to the first and the second coupler cartridge. The housing has, in the region of the coupler cartridges, its largest width in the direction of the longitudinal axis. It is intended there for two adjacent housings to be directly opposite one another at a small distance apart such that the grid spacing is as small as possible and the valve block overall requires as little installation space as possible. In the region of the bent actuating arms, by contrast, the housing can be configured with a relatively small width. This means that no additional installation space is required for the actuating arms in the direction of the longitudinal axis. In the regions in which the first or the second coupler cartridge has a small diameter, there can be an overlap in relation to the first or second actuating arm.

There can be provision that at least one fastening screw is provided by means of which an underhousing can be fastened to the housing, wherein the at least one fastening screw is in each case oriented parallel to the vertical axis, wherein at least one fastening screw is assigned a bulge in the first or second actuating arm, wherein the bulge is arranged in such a way that a screwing tool can be brought into engagement with the relevant fastening screw through the bulge. In the region of the bulge, the first or second actuating arm can to project beyond the above-discussed first or second boundary plane. On the opposite side of the housing there is then provided a recess which is configured in such a way that the movability of the relevant analogous actuating lever is ensured in spite of the protruding bulge. The bulge can have situated opposite it a recess in the housing which also provides a clearance for the screwing tool. The bulge is preferably arranged on the longer of the two actuating arms.

There can be provision that a first, a second and a third fastening screw are provided, wherein the first and the second fastening screw are arranged, in the direction of the transverse axis, at opposite ends of the housing, wherein they are arranged, in the direction of the longitudinal axis, on the same side of the housing, wherein the third fastening screw is arranged, in the direction of the transverse axis, between the first and the second fastening screw, wherein it is arranged, in the direction of the longitudinal axis, on the opposite side of the housing, wherein the bulge is assigned to the third fastening screw. The number of the fastening screws is thus particularly small, with nevertheless a fluidtight connection being achieved between the housing and the underhousing. The resultant poor accessibility to the third fastening screw is taken into account by means of the bulge.

It will be understood that the features mentioned above and those still to be explained below can be used not only in the respectively specified combination but also in other combinations or in isolation without departing from the scope of the present disclosure.

BRIEF DESCRIPTION OF THE DRAWINGS

The disclosure will be explained in more detail below with reference to the appended drawings, in which.

DETAILED DESCRIPTION

Figure 1:
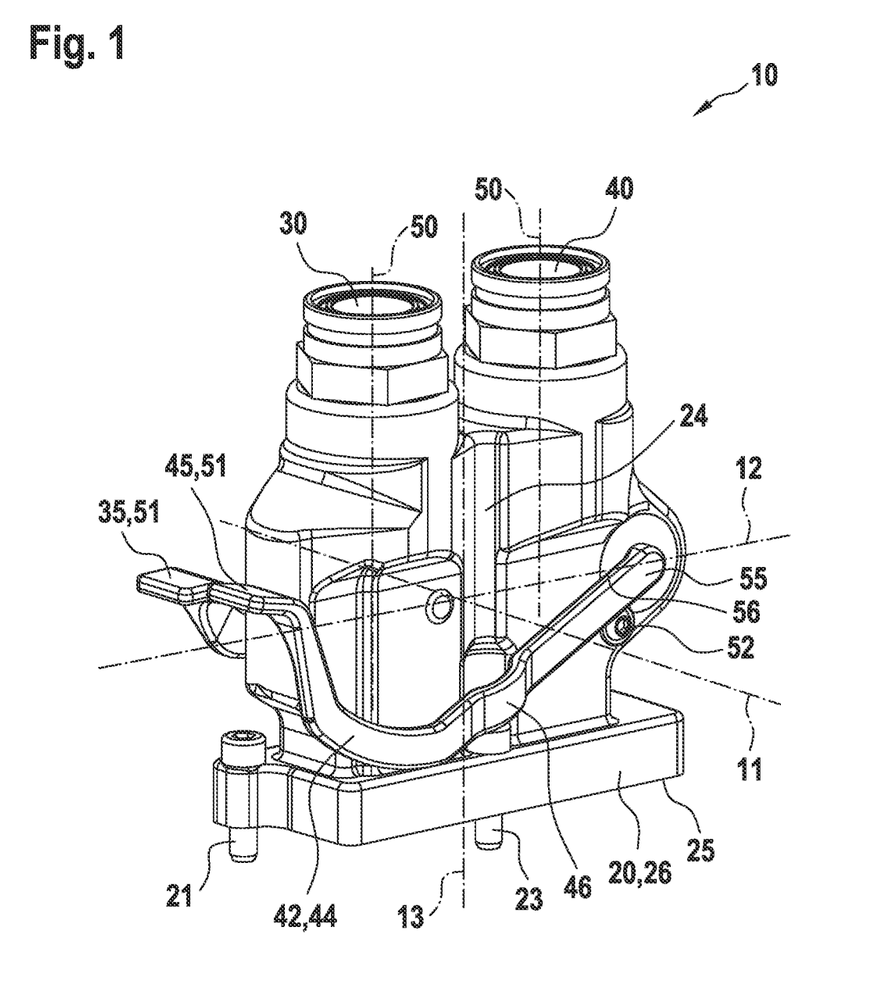
FIG. 1 shows a perspective view of the quick coupler from the second actuating lever.
Figure 2:
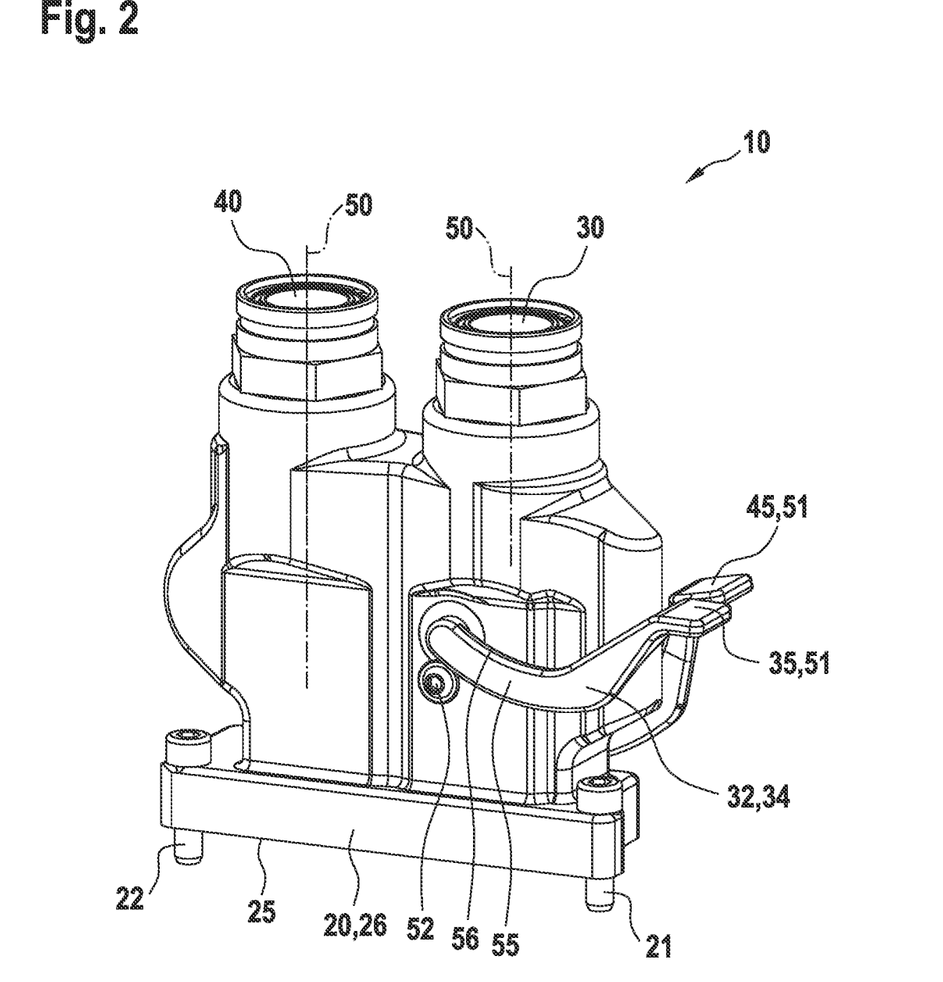
FIG. 2 shows a perspective view of the quick coupler from the first actuating lever.

FIG. 1 shows a perspective view of the quick coupler 10 from the second actuating lever 42. FIG. 2 shows a perspective view of the same quick coupler 10 from the first actuating lever 32. The quick coupler 10 comprises a housing 20 which, in the present case, is fastened by a planar sealing surface 25 on an assigned valve disk (not shown) of a valve block. Such valve disks are based on a grid spacing (No. 14 in FIG. 4). This grid spacing describes the distance with which the valve disks are arranged next to one another in the direction of the longitudinal axis 11. In the context of the disclosure, the first and second actuating lever 32; 42 are intended to be arranged within this grid spacing, with it being the case that they should project as little as possible beyond the housing 20. The grid spacing should be particularly small here. It should further be possible to provide various variants of the quick coupler 10 that differ solely in terms of the first and second coupler cartridge 30; 40 used, being otherwise designed to be substantially identical. This is explained in more detail further below with reference to FIG. 4.

The housing 20 is fastened to the valve disk by a total of three fastening screws 21; 22; 23. The fastening screws 21; 22; 23 are configured, for example, as cylinder-head screws, with their center axis running parallel to an axis 13 that is also referred to herein as the vertical axis 13 since it is shown vertically relative to the orientation depicted in the view of FIG. 1. They traverse a flange-like portion 26 of the housing 20 in the region of the sealing surface 25. The width of the flange-like portion 26 in the direction of the longitudinal axis 11 is configured to be somewhat smaller than the grid spacing (No. 14 in FIG. 4). Above the flange-like portion 26, the housing 20 is configured to be narrower, with the quantity of material required for the housing 20 having been minimized, although the necessary hydraulic pressure resistance is provided all over. The housing consists, for example, of aluminum or cast iron, a corresponding raw part preferably being produced in the casting process.

Figure 6:
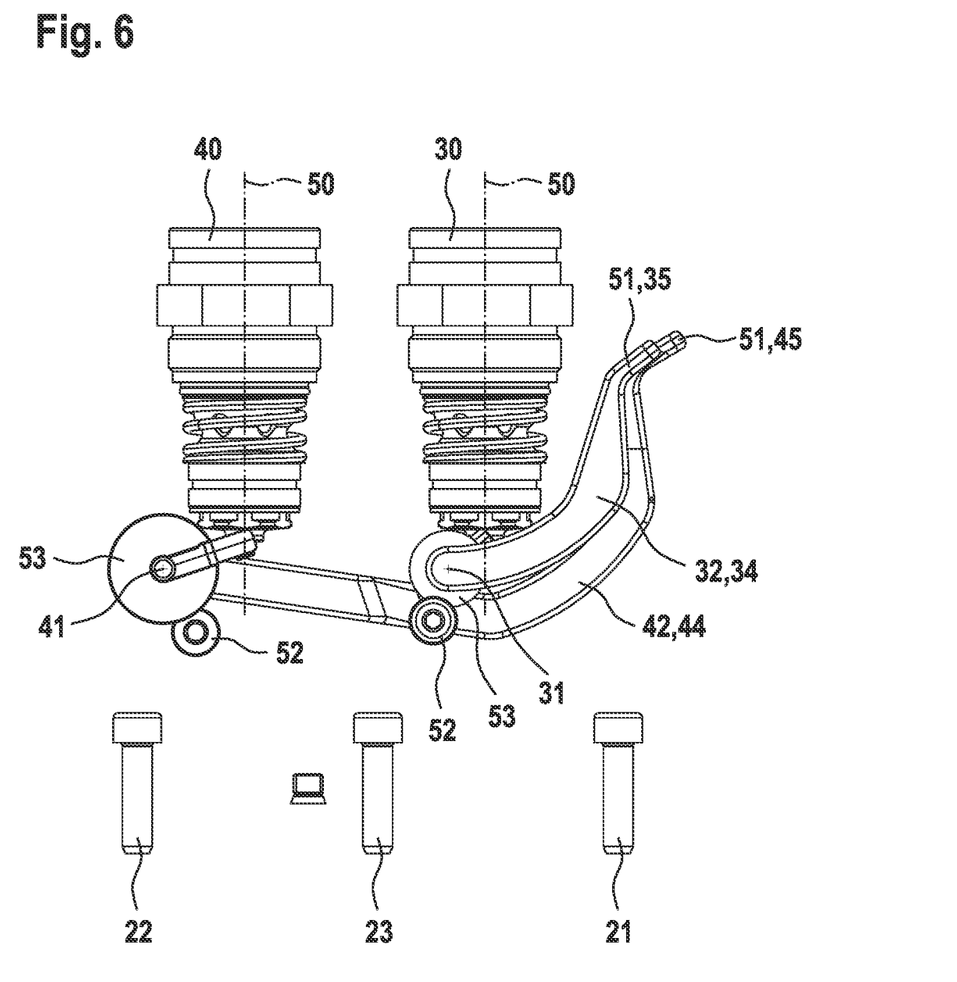
FIG. 6 shows a side view of the first and second coupler cartridge and of the first and second actuating lever.

The first and second coupler cartridge 30; 40 each have a center axis 50, with the center axes being arranged parallel to one another at a distance apart such that they define a reference plane. The vertical axis 13 is arranged parallel to the center axes 50. The transverse axis 12 is arranged perpendicularly to the vertical axis 13, with it being contained in the reference plane. The longitudinal axis 11 is oriented perpendicularly to the reference plane. The first and second coupler cartridge 30; 40 are market-standard components, with reference being made by way of example to EP 381 069 B1. Such coupler cartridges are provided from the outset to be installed in a housing, with it being the case that they can for this purpose be provided with a corresponding external thread. They are also provided to be actuated by a lever, with the lever acting on the end side of the coupler cartridge 30; 40 that is arranged in the housing 20 and points in the direction of the center axis (see FIGS. 3; 6).

The corresponding first or second actuating lever 32; 42 has three positions here. The central position illustrated in FIGS. 1 and 2 is a neutral position in which no hydraulic hose has been coupled into the coupler cartridge 30; 40. As soon as a hydraulic hose is coupled into the coupler cartridge 30; 40, the assigned actuating lever 32; 42 moves somewhat downward. There is no need for the actuating lever 32; 42 to be actuated during the coupling-in operation. When uncoupling the hydraulic hose, the corresponding actuating lever 32; 42 has to be moved into the upper position in order to cancel the locking between the coupler cartridge 30; 40 and the hydraulic hose. It is then possible for the hydraulic hose to be removed from the coupler cartridge 30; 40. The actuating lever 32; 42 subsequently returns to its central position again.

In the context of the disclosure, the first and second axis of rotation (Nos. 31; 41 in FIGS. 3; 5) of the actuating levers 32; 42 are oriented perpendicularly to the reference plane, with the first and second actuating arm 34; 44 being arranged, in the direction of the longitudinal axis 11, on opposite sides of the housing 20. As viewed in the direction of the longitudinal axis 11, the actuating arms 34; 44 are here preferably arranged away from the coupler cartridges 30; 40 in each position. It is possible there, by means of the above-discussed material-optimized configuration of the housing 20, to create the necessary clearance for the movability of the actuating arms 34; 44, without having to increase the grid spacing (No. 14 in FIG. 4). It is only by way of their actuating portion 51 on the free end 35; 45 of the actuating arm 34; 44 that the actuating arms project beyond the installation space defined by the housings 20. The position of the actuating arms 34; 44 can be chosen to be substantially identical for all nominal sizes of the coupler cartridges 30; 40. As can be seen from FIG. 4, a uniform actuation for all quick couplers 10 of a valve block results in spite of the different coupler nominal sizes.

The first and second fastening screws 21; 22 are arranged, in the direction of the longitudinal axis 11, on the same side of the housing 20, being arranged, in the direction of the transverse axis 12, in opposite corner regions of the flange-like portion 26. There, they are readily accessible for a screwing tool. In order to save on a fourth fastening screw, the third fastening screw 23 has been arranged, in the direction of the transverse axis 12, between the first and the second fastening screw 21; 22, being arranged, in the direction of the longitudinal axis 11, on the opposite side of the housing 20. In this region, the third fastening screw is poorly accessible for a screwing tool. In order nevertheless to be able to screw it in tightly, the second actuating arm 44 has been provided with a bulge 46, with the housing 20 being provided, in the region of the bulge 46, with a groove-shaped recess 24 running parallel to the vertical axis 13. There is thereby created the necessary clearance for the screwing tool, which takes the form of an Allen key, for example.

It should be noted here that the bulge 46 contravenes a basic concept of the present quick coupler 10. This basic concept is founded on the fact that substantially the entire quick coupler 10 is arranged between a first boundary plane and a parallel second boundary plane. The first and the second boundary plane are spaced apart from one another by the grid spacing (No. 14 in FIG. 4), with them being oriented parallel to the reference plane. The bulge 46 projects beyond the assigned second boundary plane, with the housing 20 being designed to be correspondingly set back on the opposite first boundary plane in order to ensure that the movability of the analogous second actuating arm 44 of the adjacent quick coupler is not impeded.

What can further be seen in FIGS. 1 and 2 is the fundamentally rectangular cross-sectional shape of the first and second actuating arm 34; 44 away from the actuating portion 51. The corresponding relatively short rectangle side 56 is oriented parallel to the longitudinal axis 11, with its length being configured to be identical all over. This length is configured to be small in order for the actuating arm 34; 44 to require little space in the direction of the grid spacing. The relatively long rectangle side 55 is arranged parallel to the reference plane. The corresponding length can change along the relevant actuating arm 34; 44 such that the actuating arm 34; 44 has optimal stiffness. The relatively long rectangle side 55 coincides with the above-discussed first or second boundary plane or is arranged parallel thereto at a small distance apart.

The first or second free end 35; 45 of the first and second actuating arm 34; 44 projects, in the direction of the transverse axis 12, beyond the housing 20. Provided there in each case is an actuating portion 51 which is manually actuated by the user of the quick coupling 10. The actuating portion 51 substantially takes the form of a planar plate with constant thickness such that it has a large actuating surface.

It is oriented perpendicularly to the reference plane. It projects, exclusively with respect to the reference plane, beyond the relevant actuating arm 34; 44. In the region of the reference plane, the two actuating portions 51 of the quick coupler 10 are directly opposite one another at a small distance apart in at least one position of the actuating levers 32; 42.

The two actuating levers 32; 42 are each assigned a retaining screw 52 which is screwed into the housing 20, with the head of said screw covering the disk portion (No. 53 in FIG. 5) of the relevant actuating lever 32; 42. As a result, the actuating levers 32; 42 are retained in the housing 20 in the direction of the longitudinal axis 11.

Figure 3:
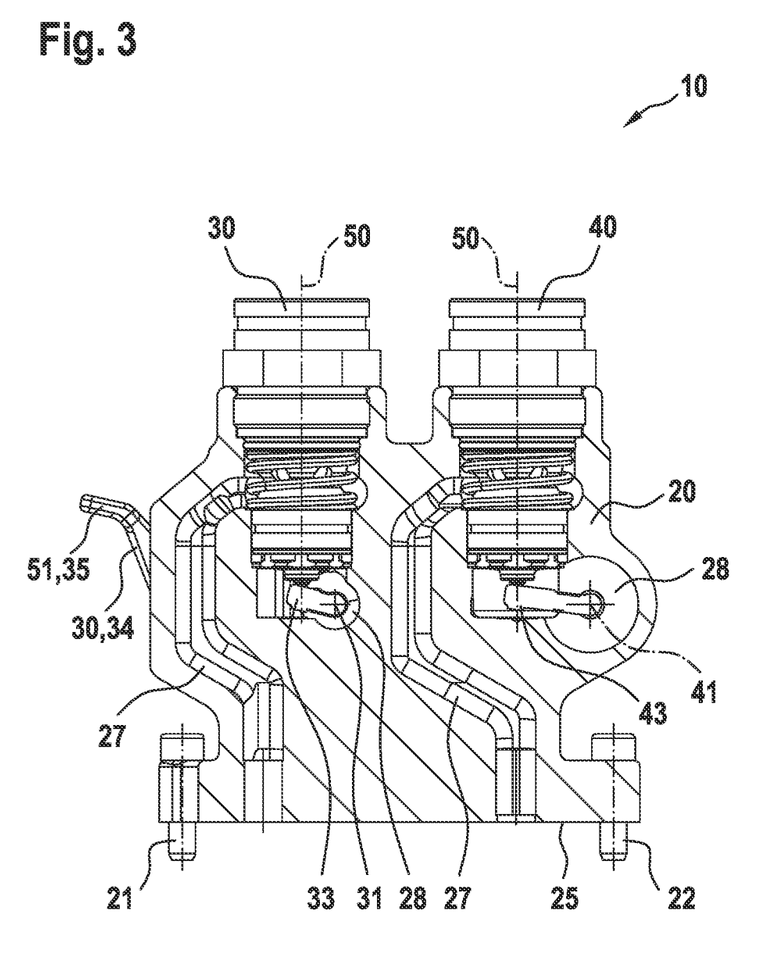
FIG. 3 shows a sectional view of the quick coupler, wherein the section plane coincides with the reference plane.

FIG. 3 shows a sectional view of the quick coupler 10, with the section plane coinciding with the reference plane. The two coupler cartridges 30; 40 are each assigned a fluid duct 27 in the housing 20 that in each case opens out at the sealing surface 25. At the opposite end, the fluid duct 27 is connected to a circumferential surface of the relevant coupler cartridge 30; 40.

On an end face of the two coupler cartridges 30; 40 that points in the direction of the center axis 50 there is in each case arranged a first or a second switching cam of the relevant actuating lever. The first switching cam 33 is configured to be shorter than the second switching cam 43, this being due to the first or second actuating arm having different lengths. There thus results a substantially identical lever ratio on both actuating levers.

It can also be gathered from FIG. 3 that the free ends of both actuating levers 32; 42 and the relevant axes of rotation 31; 41 are arranged, in the direction of the transverse axis, on opposite sides of the relevant coupler cartridge 30; 40. This allows particularly the second actuating arm 44 to be configured to be particularly long.

The clearance in the housing 20 that is arranged around the actuating cams 33; 43 forms a leakage oil space 28 which can preferably be connected to a tank via a leakage oil duct (not visible), with the result that the leakages occurring there can be channeled off. The leakage oil duct preferably leads over the sealing surface 25.

Figure 4:
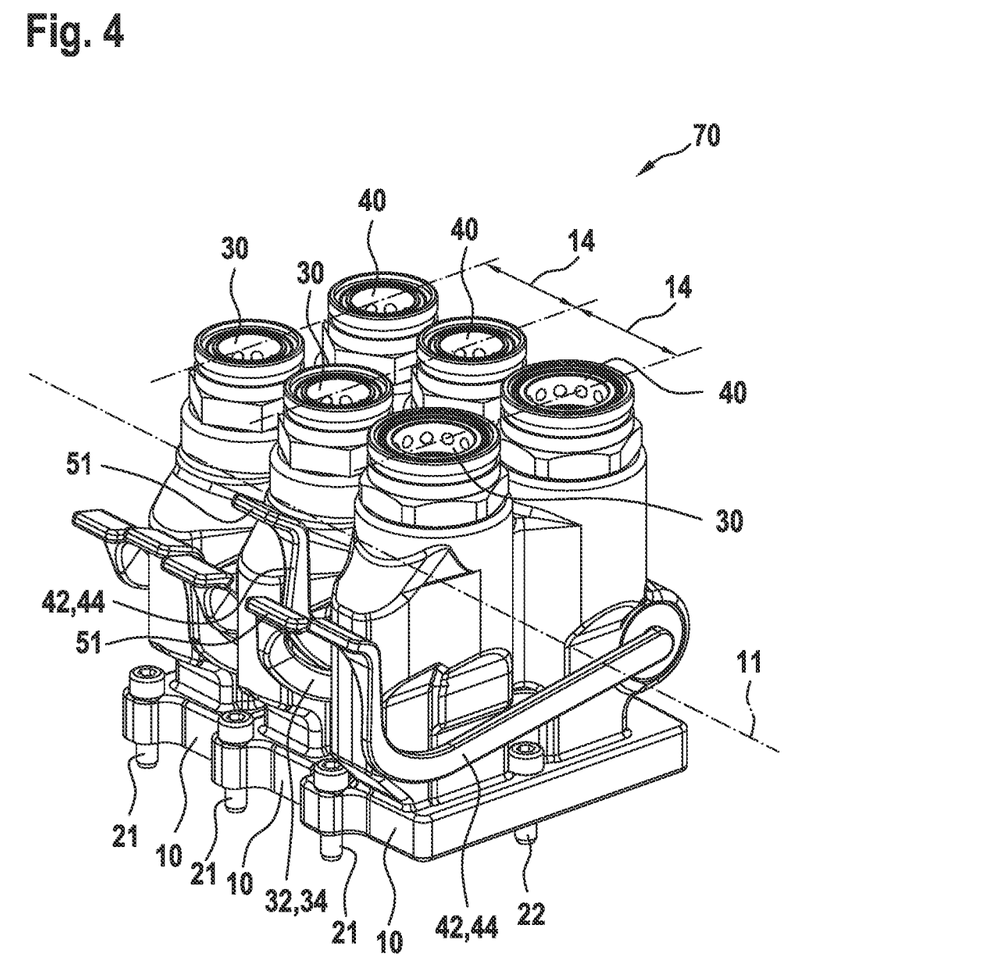
FIG. 4 shows a perspective view of an assembly which comprises a plurality of quick couplers which are arranged next to one another in the direction of the longitudinal axis.
Figure 5:
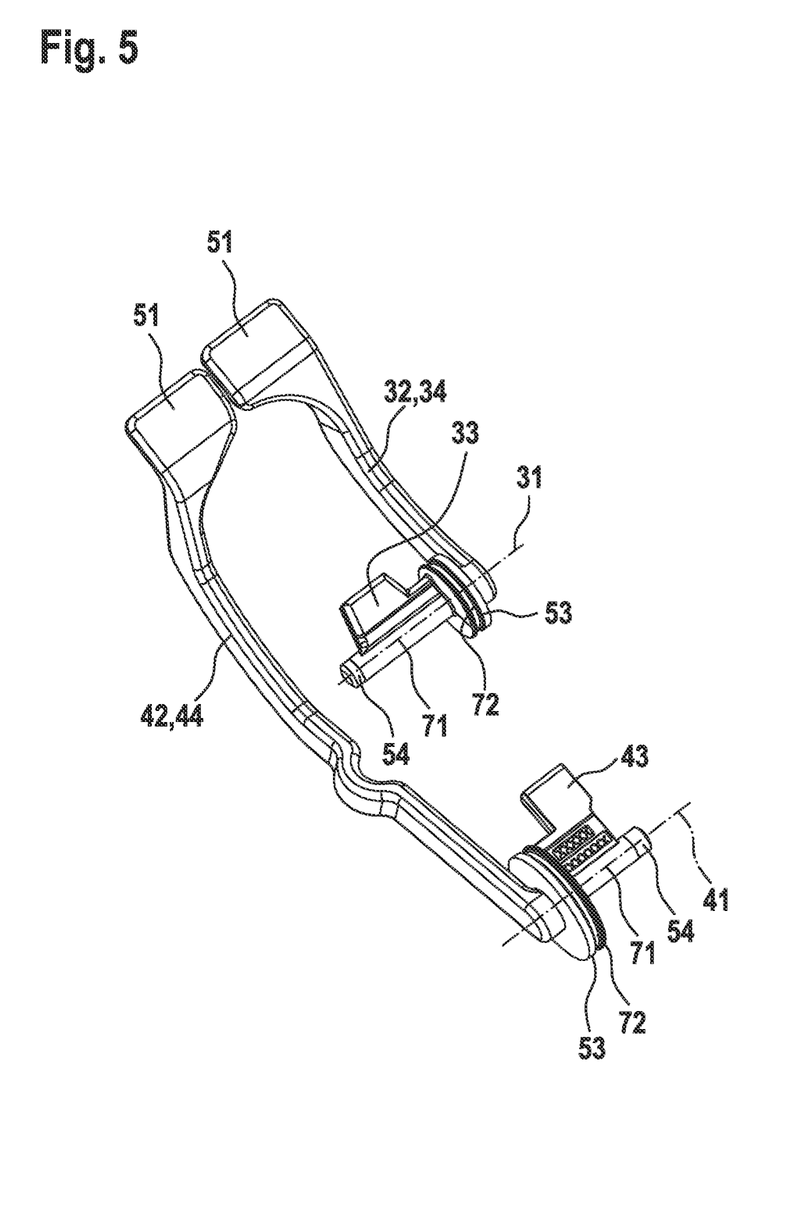
FIG. 5 shows a perspective view of the first and second actuating lever in their installed position.

FIG. 4 shows a perspective view of an assembly 70 which comprises a plurality of quick couplers 10 which are arranged next to one another in the direction of the longitudinal axis 11. Here, the quick couplers 10 are spaced apart from one another with the constant grid spacing 14, with the corresponding spacing lines in FIG. 4 being positioned on the center axes (No. 50 in FIG. 3) of the first and second coupler cartridges 30; 40.

It can be seen in FIG. 4 how the first and second actuating arms 34; 44 of two adjacent quick couplers can move past one another in a disturbance-free manner, since they have their planar surfaces situated opposite one another at a small distance apart. Nor do the actuating portions 51 impede this movement.

The three quick couplers 10 in FIG. 4 have coupler cartridges 30; 40 with different nominal sizes of ¾ inch, ⅝ inch or ½ inch. Nevertheless, all of the quick couplers 10 are configured to be substantially identical, with in particular the connection dimensions being identical. Namely, all three fastening screws 21; 22; 23 are arranged at the same location. This likewise applies to the center axes of the first and second coupler cartridges 30; 40 and the actuating portions 51 of the actuating levers 32; 42. Furthermore, the actuating portions 51 are arranged at the same location.

FIG. 5 shows a perspective view of the first and second actuating lever 32; 42 in their installed position. The two actuating levers 32; 42 are each formed in one piece, with them preferably consisting of metal, in particular of aluminum or steel. They comprise the already-explained first or second actuating arm 34; 44, which is arranged outside of the housing. In the interior of the housing, they each comprise a substantially circular cylindrical axle 71 which defines the relevant axis of rotation 31; 41. The free end of this axle 71 forms a bearing portion 54 which engages into an adapted bore in the housing so as to form a rotary bearing. The relevant switching cam 33; 43 is formed in one piece onto the axle 71.

At the transition between the axle 71 and the actuating arm 34; 44 there is in each case arranged a disk portion 53 which is received in an adapted bore in the housing. The circumferential surface, which is circular cylindrical with respect to the relevant axis of rotation 31; 41 is provided with a groove 72 in which there is received a sealing ring (not shown). The diameter of the disk portion is chosen to be large enough for the assigned actuating cam 33; 43 to be able to be inserted through the assigned bore into the housing.

The retaining screws (No. 52 in FIGS. 1 and 2) have their head bearing on the outside of the disk portion 53.

FIG. 6 shows a side view of the first and second coupler cartridge 30; 40 and of the first and second actuating lever 32; 42. There may also be mentioned that the quick coupler is illustrated without the housing in the side view. Here, the actuating levers 32; 42 are illustrated in their uppermost position. It can be seen that the arcuate curvature of the first and second actuating lever 32; 42 is in each case designed in such a way that, as viewed in the direction of the longitudinal axis, they substantially do not cover the coupler cartridges 30; 40. They thus extend in a region of the housing in which the housing can, without disadvantage, be configured to be narrower in the direction of the longitudinal axis than in the region of the coupler cartridges 30; 40.

REFERENCE SIGNS

10 Quick coupler
11 Longitudinal axis
12 Transverse axis
13 Vertical axis
14 Grid spacing
20 Housing
21 First fastening screw
22 Second fastening screw
23 Third fastening screw
24 Recess (for screwing tool)
25 Sealing surface
26 Flange-like portion
27 Fluid duct
28 Leakage oil space
30 First coupler cartridge
31 First axis of rotation
32 First actuating lever
33 First actuating cam
34 First actuating arm
35 First free end
40 Second coupler cartridge
41 Second axis of rotation
42 Second actuating lever
43 Second actuating cam
44 Second actuating arm
45 Second free end
46 Bulge
50 Center axis of a coupler cartridge
51 Actuating portion
52 Retaining screw 53 Disk portion
54 Bearing portion
55 Relatively long rectangle side
56 Relatively short rectangle side
70 Assembly
71 Axle
72 Groove

The invention claimed is:

1. A quick coupler comprising:
a first coupler cartridge having a first center axis;
a second coupler cartridge having a second center axis;
a housing in which the first and a second coupler cartridges are received,
wherein the first and second center axes are spaced-apart from one another and run parallel to a third axis such that the first and second center axes are contained in a common reference plane,
wherein the reference plane includes a transverse axis arranged perpendicularly to the third axis, and a longitudinal axis is defined perpendicularly to the reference plane,
wherein the first coupler cartridge is assigned a first actuating lever that is pivotable about a first axis of rotation, the first actuating lever having a first actuating cam and a first actuating arm, the first actuating cam configured such that the first actuating cam engages with an end side of the first coupler cartridge that points in a direction of the third axis for actuation,
wherein the second coupler cartridge is assigned a second actuating lever that is pivotable about a second axis of rotation, the second actuating lever having a second actuating cam and a second actuating arm, the second actuating cam configured such that the second actuating cam engages with an end side of the second coupler cartridge that points in the direction of the third axis for actuation,
wherein the first and second actuating arms are arranged outside the housing,
wherein the first and second axes of rotation are oriented perpendicularly to the reference plane, and
wherein the first and the second actuating arm are arranged, in a direction of the longitudinal axis, on opposite sides of the housing.

2. The quick coupler according to claim 1, wherein;
at least one of the first actuating arm and the second actuating arm has, as viewed in cross section, a cross-sectional shape with a relatively long side and a relatively short side,
the relatively long side is at least twice as long as the relatively short side, and
the relatively long side is oriented parallel to the reference plane.

3. The quick coupler according to claim 2, wherein:
both of the first and second actuating arms have the cross-sectional shape with the relatively long side and the relatively short side,
the relatively long side of the first actuating arm defines a first boundary plane during pivoting movement of the first actuating arm,
the relatively long side of the second actuating arm defines a second boundary plane during pivoting movement of the second actuating arm, and the quick coupler is arranged between the first and second boundary planes.

4. The quick coupler according to claim 1, further comprising:
at least one fastening screw that fastens an underhousing to the housing,
wherein each screw of the at least one fastening screw is oriented parallel to the third axis, wherein
one or more of the at least one fastening screw is assigned a bulge in the first or second actuating arm, the bulge enabling engagement of a screwing tool with the relevant fastening screw through the bulge.

5. The quick coupler according to claim 4, wherein:
the at least one fastening screw includes a first fastening screw, a second fastening screw, and a third fastening screw,
the first and second fastening screws are arranged at opposite ends of the housing in a direction of the transverse axis and on the same side of the housing in the direction of the longitudinal axis,
the third fastening screw is arranged between the first and second fastening screws in the direction of the transverse axis and on the opposite side of the housing in the direction of the longitudinal axis, and
the bulge is assigned to the third fastening screw.

6. The quick coupler according to claim 4, wherein the effective length of the first and second actuating cams are different in such a way that an identical lever ratio results on the first and second actuating levers.

7. The quick coupler according to claim 1, wherein:
the first actuating arm has a first free end and the second actuating arm has a second free end,
the first and second free ends are arranged, in a direction of the transverse axis, on a side of the housing that is assigned to the first coupler cartridge, and
the first actuating arm is shorter than the second actuating arm.

8. The quick coupler according to claim 7, wherein the first and second free ends each have a plate-like actuating portion arranged, in the direction of the longitudinal axis, completely on a side of the associated one of the first and second actuating arm which faces the other of the first and second actuating arm.

9. The quick coupler according to claim 1, wherein:
a first free end of the first actuating arm and the first axis of rotation are arranged, in a direction of the transverse axis, on opposite sides of the first coupler cartridge, and/or
a second free end of the second actuating arm and the second axis of rotation are arranged, in the direction of the transverse axis, on opposite sides of the second coupler cartridge.

10. The quick coupler according to claim 1, wherein:
the first and second actuating arms have different lengths,
the effective length of the first and second actuating cams are different.

11. The quick coupler according to claim 1, wherein the first and second actuating arms extend with a bent profile in such a way that, in each pivoted position, as viewed in the direction of the longitudinal axis, the first and second actuating arms are arranged adjacent to the first and second coupler cartridges.

* * * * *